US006967718B1

(12) United States Patent
Carlisle et al.

(10) Patent No.: US 6,967,718 B1
(45) Date of Patent: Nov. 22, 2005

(54) METHOD AND APPARATUS FOR MONITORING WDM CHANNELS AND FOR ANALYZING DISPERSED SPECTRUM OF LIGHT

(75) Inventors: Clinton B. Carlisle, Palo Alto, CA (US); Jahja I. Trisnadi, Cupertino, CA (US); Douglas A. Webb, Los Altos, CA (US); David Lehoty, Mountain View, CA (US); Kais Almarzouk, Tustin, CA (US); Akira Tomita, Redwood City, CA (US)

(73) Assignee: Silicon Light Machines Corportion, Sunnyvale, CA (US)

( * ) Notice: Subject to any disclaimer, the term of this patent is extended or adjusted under 35 U.S.C. 154(b) by 330 days.

(21) Appl. No.: 10/377,977

(22) Filed: Feb. 28, 2003

(51) Int. Cl.[7] .............................. G01J 3/28
(52) U.S. Cl. ................................... 356/328
(58) Field of Search ................. 356/328, 334; 359/573

(56) References Cited

U.S. PATENT DOCUMENTS

| | | |
|---|---|---|
| 4,257,053 A | 3/1981 | Gilbreath |
| 4,561,011 A | 12/1985 | Kohara et al. |
| 5,216,278 A | 6/1993 | Lin et al. |
| 5,229,597 A | 7/1993 | Fukatsu |
| 5,315,429 A | 5/1994 | Abramov |
| 5,320,709 A | 6/1994 | Bowden et al. |
| 5,552,635 A | 9/1996 | Kim et al. |
| 5,661,592 A | 8/1997 | Bornstein et al. ............ 359/291 |
| 5,832,148 A | 11/1998 | Yariv |
| 5,841,929 A | 11/1998 | Komatsu et al. |
| 5,844,711 A | 12/1998 | Long, Jr. |
| 6,012,336 A | 1/2000 | Eaton et al. |
| 6,071,652 A | 6/2000 | Feldman et al. ............... 430/5 |
| 6,096,656 A | 8/2000 | Matzke et al. |
| 6,154,305 A | 11/2000 | Dickensheets et al. |
| 6,172,796 B1 | 1/2001 | Kowarz et al. .............. 359/290 |
| 6,181,458 B1 | 1/2001 | Brazas, Jr. et al. .......... 359/290 |
| 6,392,748 B1 * | 5/2002 | Fateley ....................... 356/330 |
| 6,421,179 B1 | 7/2002 | Gutin et al. ................. 359/572 |
| 6,438,954 B1 | 8/2002 | Goetz et al. |
| 6,785,001 B2 * | 8/2004 | Almarzouk et al. ......... 356/450 |
| 6,822,797 B1 * | 11/2004 | Carlisle et al. ............. 359/572 |
| 2002/0131228 A1 | 9/2002 | Potter |
| 2002/0195418 A1 | 12/2002 | Kowarz et al. |
| 2002/0196492 A1 | 12/2002 | Trisnadi et al. |

* cited by examiner

*Primary Examiner*—Gregory J. Toatley, Jr.
*Assistant Examiner*—Kara Geisel
(74) *Attorney, Agent, or Firm*—Okamoto & Benedicto LLP

(57) ABSTRACT

An apparatus for measuring wavelength composition and power of a dispersed spectrum of light comprises a diffractive light modulator and a detector. The diffractive light modulator comprises an array of light modulating pixels operable in a first mode and a second mode. In operation, the dispersed spectrum of light illuminates the diffractive light modulator along the array of light modulating pixels, which selectively directs a subset of the dispersed spectrum of light into the first mode while directing a remainder of the dispersed spectrum of light into the second mode. The detector is optically coupled to the diffractive light modulator. In operation, the detector detects the subset of the dispersed spectrum of light while not detecting the remainder of the dispersed spectrum of light. Each of the light modulating pixels is controlled by signals sent from a controller. The signals comprise a time division multiplex modulation, a code division multiplex modulation, or a combination thereof.

45 Claims, 13 Drawing Sheets

|  | First Bit | Second Bit | Third Bit | Fourth Bit | Fifth Bit | Sixth Bit | Seventh Bit |
|---|---|---|---|---|---|---|---|
| First Sequence Code | 0 | 0 | 1 | 1 | 1 | 0 | 1 |
| Second Sequence Code | 0 | 1 | 1 | 1 | 0 | 1 | 0 |
| Third Sequence Code | 1 | 1 | 1 | 0 | 1 | 0 | 0 |
| Fourth Sequence Code | 1 | 1 | 0 | 1 | 0 | 0 | 1 |

Fig. 9

|  | Integration Period ($t_1 \ldots t_7$) | | | | | | |
|---|---|---|---|---|---|---|---|
| Time Increments | $t_1$ | $t_2$ | $t_3$ | $t_4$ | $t_5$ | $t_6$ | $t_7$ |
| First Pixel Intensity 190' | $I_A/C_A$ | $I_A/C_A$ | $I_A$ | $I_A$ | $I_A$ | $I_A/C_A$ | $I_A$ |
| Second Pixel Intensity 191' | $I_B/C_B$ | $I_B$ | $I_B$ | $I_B$ | $I_B/C_B$ | $I_B$ | $I_B/C_B$ |
| Third Pixel Intensity 192' | $I_C$ | $I_C$ | $I_C$ | $I_C/C_C$ | $I_C$ | $I_C/C_C$ | $I_C/C_C$ |
| Fourth Pixel Intensity 193' | $I_D$ | $I_D$ | $I_D/C_D$ | $I_D$ | $I_D/C_D$ | $I_D/C_D$ | $I_D$ |
| Detector Intensity | $I_1$ | $I_2$ | $I_3$ | $I_4$ | $I_5$ | $I_6$ | $I_7$ |

Fig. 10

METHOD AND APPARATUS FOR MONITORING WDM CHANNELS AND FOR ANALYZING DISPERSED SPECTRUM OF LIGHT

FIELD OF THE INVENTION

This invention relates to the field of analysis of light. More particularly, this invention relates to the field of analysis of light where a dispersed spectrum of light, such as a dispersed spectrum of WDM (wavelength division multiplexing) channels, is analyzed.

BACKGROUND OF THE INVENTION

Spectroscopy is analysis of a dispersed spectrum of light. A method for performing spectroscopy uses a grating spectrograph. The grating spectrograph employs a diffraction grating, a lens, and a detector array. In operation, a beam of light is dispersed by the diffraction grating. Typically, a first order diffraction is imaged by the lens onto the detector array. This produces a dispersed spectrum of light on the detector array. The detector array provides a signal to electronics which process the signal to provide an analysis of the dispersed spectrum of light.

In WDM (wavelength division multiplexed) optical communications, multiple wavelengths of light each carry a communication signal. Each of the multiple wavelengths of light forms a channel. In DWDM (dense WDM) optical communication, a subset of the WDM optical communication, the channels are spaced close together. A typical DWDM application operates at a wavelength band about 1,550 nm, has 80 channels, and has spacing of 0.4 nm between adjacent channels.

In WDM optical communications there is a need to monitor the wavelength and power level of each channel. This is especially required for DWDM optical communications because of the close spacing between adjacent channels.

A method of monitoring the WDM channels employs a grating spectrograph where the dispersed spectrum is a WDM wavelength band.

The grating spectrograph has a number of deficiencies which reduce a quality of the analysis of the dispersed spectrum of light. Because the grating spectrograph images the dispersed spectrum of light onto the detector array, the grating spectrograph's stability and sensitivity is limited by the detector array's number of detecting elements. Because the sensitivity of the detector array is limited, resolution of the detector array is also limited. Further, because the grating spectrograph images the dispersed spectrum of light onto the detector array, the grating spectrograph is susceptible to 1/f noise and drift. Moreover, because the grating spectrograph images the dispersed spectrum of light onto the detector array, the detecting elements are susceptible to saturation. In other words, the detecting elements have limited dynamic range.

What is needed is a method of analyzing a dispersed spectrum of light which is stable, sensitive, economical, and which provides greater resolution.

What is needed is a method of analyzing a dispersed spectrum of light which provides greater dynamic range, which is not subject to 1/f noise, and which is not subject to drift.

What is needed is a method of monitoring WDM channels which is stable, sensitive, cost efficient, and which provides greater resolution.

What is needed is a method of monitoring WDM channels which provides greater dynamic range, which is not subject to 1/f noise, and which is not subject to drift.

SUMMARY OF THE INVENTION

An apparatus for measuring wavelength composition and power of a dispersed spectrum of light comprises a diffractive light modulator and a detector. The diffractive light modulator comprises a linear array of light modulating pixels operable in a first mode and a second mode. In operation, the dispersed spectrum of light illuminates the diffractive light modulator along the linear array of light modulating pixels. The diffractive light modulator selectively directs a subset of the dispersed spectrum of light into the first mode while directing a remainder of the dispersed spectrum of light into the second mode. The detector is optically coupled to the diffractive light modulator. In operation, the detector detects the subset of the dispersed spectrum of light while not detecting the remainder of the dispersed spectrum of light.

An alternative method analyzes a spectrum of light. The spectrum of light is dispersed along a light modulator, which comprises an array of pixels including first pixels interdigitated with second pixels. The first pixels are driven with a first orthogonal code where the first orthogonal code includes a third mode, which directs light illuminating the first pixels onto an array of detecting elements. The first orthogonal code further includes a fourth mode, which directs the light illuminating the first pixels away from the array of detecting elements. The second pixels are driven with a second orthogonal code. The second orthogonal code includes the third mode, which directs light illuminating the second pixels onto the array of detecting elements. The second orthogonal code further includes the fourth mode, which directs the light illuminating the second pixels away from the array of detecting elements. A signal is generated from the array of detecting elements detecting light from the first and second pixels. The signal is processed using an orthogonality condition between the first and second orthogonal codes to provide an analysis of the spectrum of light where the analysis distinguishes light illuminating the first pixels from light illuminating the second pixels. Preferably, the orthogonal codes are formed from time division multiplex modulation, code division multiplex modulation, or a combination of both time and code division multiplex modulation.

BRIEF DESCRIPTION OF THE DRAWINGS

FIG. 9 is a table of four seven-bit maximal length sequence codes of the embodiment illustrated in FIGS. 5–8.

FIG. 10 is a table of four pixel intensities for an integration period of seven time increments of the embodiment illustrated in FIGS. 5–9.

DETAILED DESCRIPTION OF THE EMBODIMENTS

The present invention uses a diffractive light modulator and a detector to determine wavelength composition and power of a dispersed spectrum of light. This allows for rapid, sensitive, monitoring of the wavelength composition and the power of the dispersed spectrum of light while avoiding constraints imposed by photodetector array dimensions. Further, the diffractive light modulator permits enhanced photo-detection sensitivity by displacing a detection frequency away from 1/f-type noise and drift. Preferably, the diffractive light modulator is a grating light valve type device, which is preferred because of its accuracy and speed characteristics. Alternatively, a different diffractive light modulator is used. The present invention preferably employs a combination of a code division multiplex technique and a time division multiplex technique.

Figure 1:
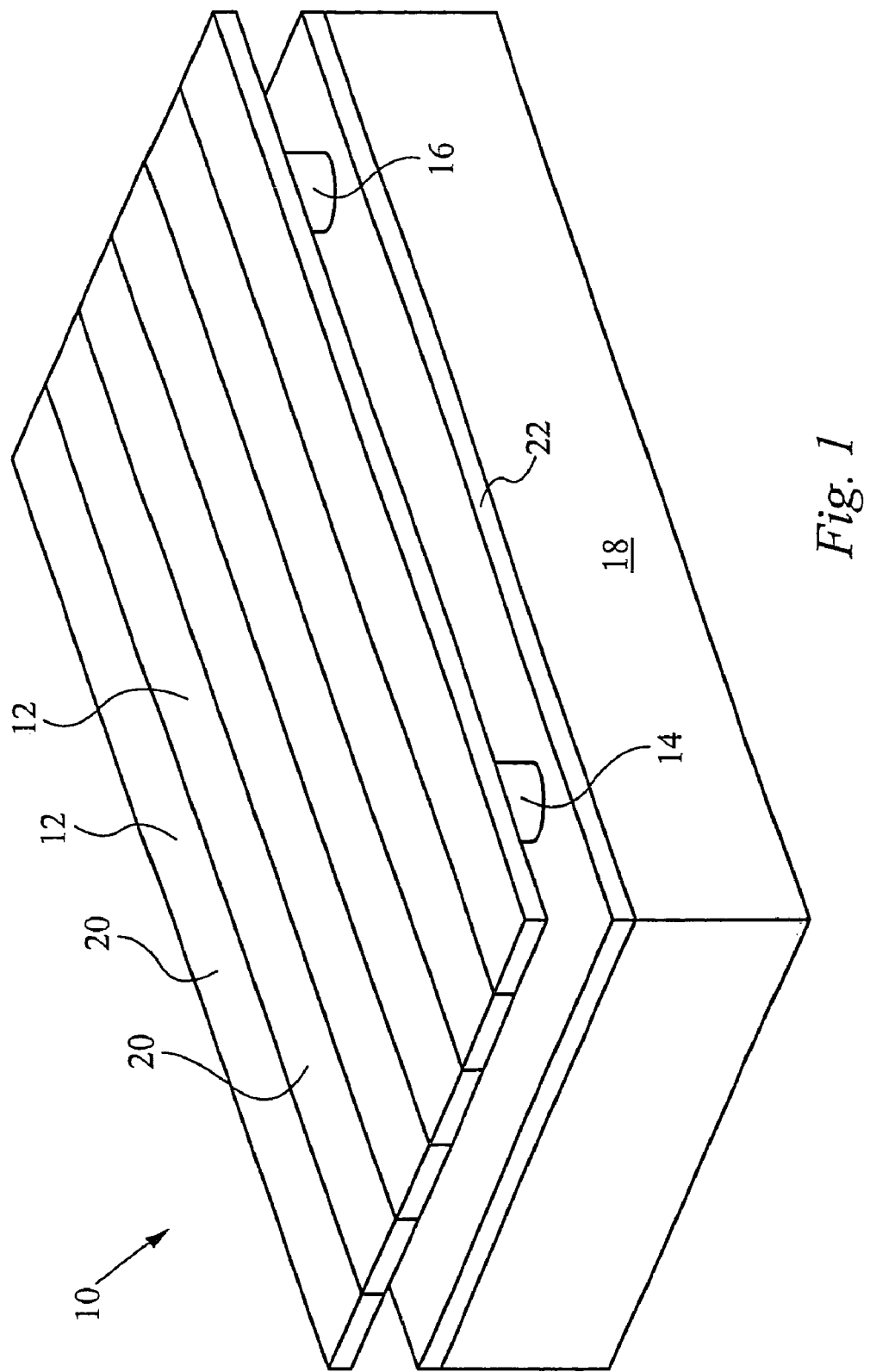
FIG. 1 illustrates an isometric view of a grating light valve type device of the present invention.

The grating light valve type device of the present invention is illustrated in FIG. 1. The grating light valve type device 10 preferably comprises elongated elements 12 suspended by first and second posts, 14 and 16, above a substrate 18. The elongated elements 12 comprise a conducting and reflecting surface 20. The substrate comprises a conductor 22. In operation, the grating light valve type device operates to produce modulated light selected from a reflection mode and a diffraction mode.

Figure 2A:
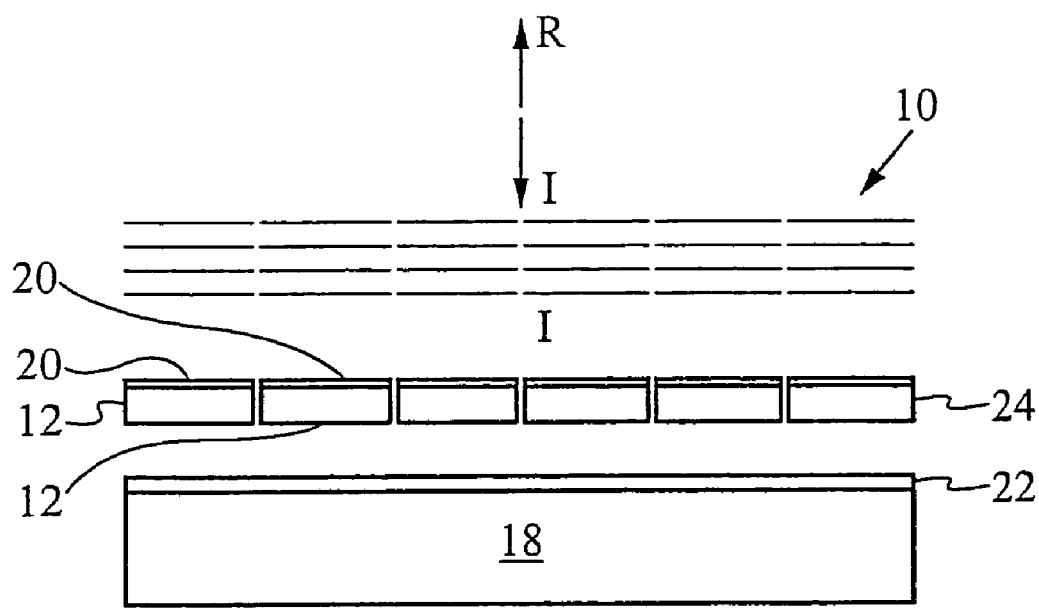
FIGS. 2A and 2B illustrate a cross-section of the grating light valve type device of the present invention in a reflecting mode and a diffracting mode, respectively.
Figure 2B:
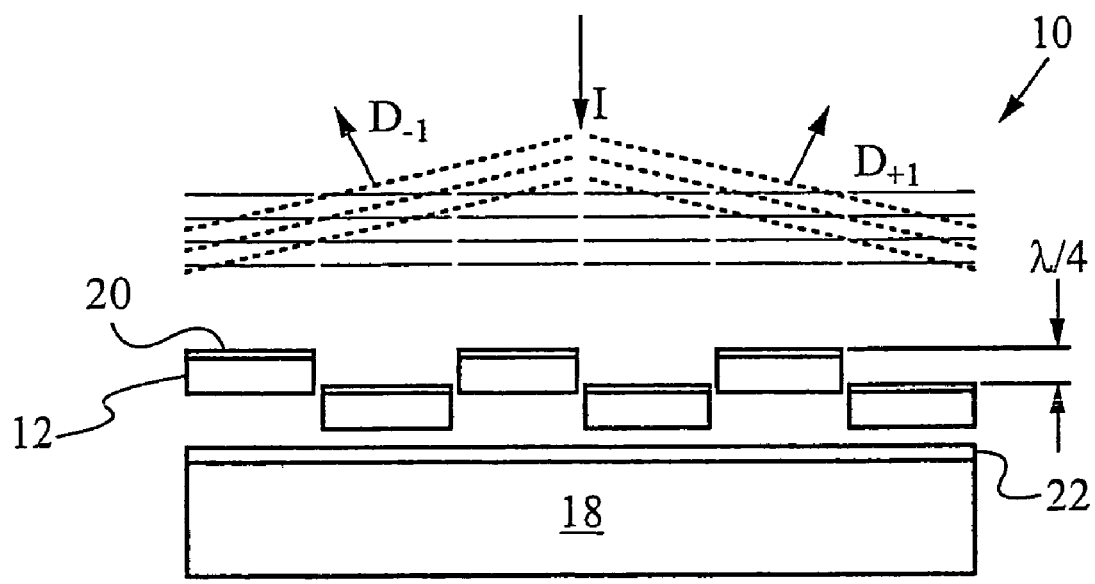

A cross-section of the grating light valve type device 10 of the present invention is further illustrated in FIGS. 2A and 2B. The grating light valve type device 10 comprises the elongated elements 12 suspended above the substrate 18. The elongated elements comprise the conducting and reflecting surface 20 and a resilient material 24. The substrate 18 comprises the conductor 22.

FIG. 2A depicts the grating light valve type device 10 in the reflection mode. In the reflection mode, the conducting and reflecting surfaces 20 of the elongated elements 12 form a plane so that incident light I reflects from the elongated elements 12 to produce reflected light R.

FIG. 2B depicts the grating light valve type device 10 in the diffraction mode. In the diffraction mode, an electrical bias causes alternate ones of the elongated elements 12 to move toward the substrate 18. The electrical bias is applied between the reflecting and conducting surfaces 20 of the alternate ones of the elongated elements 12 and the conductor 22. The electrical bias results in a height difference of a quarter wavelength $\lambda/4$ of the incident light I between the alternate ones of the elongated elements 12 and non-biased ones of the elongated elements 12. The height difference of the quarter wavelength $\lambda/4$ produces diffracted light including plus one and minus one diffraction orders, $D_{+1}$ and $D_{-1}$.

FIGS. 2A and 2B depict the grating light valve type device 10 in the reflection and diffraction modes, respectively. For a deflection of the alternate ones of the elongated elements 12 of less than a quarter wavelength $\lambda/4$, the incident light I both reflects and diffracts producing the reflected light R and the diffracted light including the plus one and minus one diffraction orders, $D_{+1}$, and $D_{-1}$.

It will be readily apparent to one skilled in the art that the conducting and reflecting surface 20 can be replaced by a multilayer dielectric reflector and a conducting element where the conducting element is buried within each of the elongated elements 12 or within just the alternate ones of the elongated elements 12. Further, it will be readily apparent to one skilled in the art that the conducting and reflecting surface 20 can be coated with a transparent layer such as an anti-reflective layer.

While FIGS. 1, 2A, and 2B depict the grating light valve type device 10 having six of the elongated elements 12, the grating light valve type device 10 preferably includes more of the elongated elements 12. By providing more of the elongated elements 12, the elongated elements 12 are able to function as groups, which are referred to as pixels. Preferably, each pixel is a group of six of the elongated elements 12. Alternatively, each pixel is a group of more or less elongated elements 12. Preferably, the grating light valve type device 10 includes 1,080 of the pixels. Alternatively, the grating light valve type device 10 includes more or less of the pixels.

Figure 3:
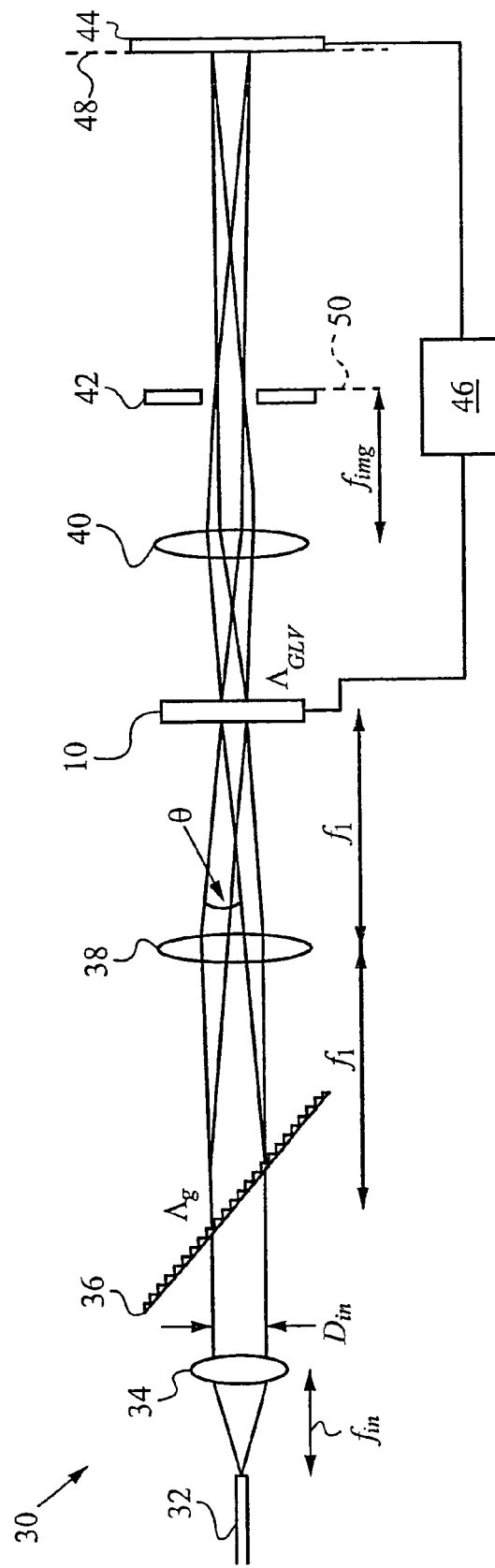
FIG. 3 illustrates a preferred embodiment of the present invention.

The preferred embodiment of the present invention is illustrated in FIG. 3. The preferred embodiment 30 comprises an optical fiber 32, a collimation lens 34, a diffraction grating 36, a transform lens 38, the grating light valve type device 10, an imaging lens 40, an aperture stop 42, a linear array of detecting elements 44, and electronics 46. The collimation lens 34 optically couples the optical fiber 32 to the diffraction grating 36. The transform lens 38 optically couples the diffraction grating 36 to the grating light valve type device 10. The imaging lens 40 optically couples the grating light valve type device 10 to the linear array of detecting elements 44, via the aperture stop 42. The electronics 46 are coupled to the grating light valve type device 10 and the linear array of detecting elements 44.

In operation, the optical fiber 32 emits a beam of light comprising a spectrum of light. The collimation lens 34 collimates the beam of light. Preferably, the diffraction grating 36 disperses the beam of light. More generally, a dispersion device disperses the beam of light where the dispersion device is selected from a group comprising the diffraction grating 36, a prism, and a grism. Next, the transform lens 38 focuses the beam of light along the grating light valve type device 10 as a dispersed spectrum of light. The transform lens 38 converts angle into position and focuses the beam of light onto the grating light valve type device 10. In other words, the collimation lens 34, the dispersion device, and the transform lens 38 cause the beam of light emitted by the optical fiber 32 to be dispersed and spatially separated into wavelengths at separately distinct and separate locations along the grating light valve type device 10. The dispersed and spatially separated wavelengths form the dispersed spectrum of light.

The grating light valve type device 10 preferably modulates the dispersed spectrum of light so that a subset of the dispersed spectrum of light is directed into the reflection mode while a remainder of the dispersed spectrum of light is directed into the diffraction mode including the plus one and minus one diffraction orders, $D_{+1}$, and $D_{-1}$. The dispersed spectrum of light is then imaged by the imaging lens 40 so that the subset of light in the reflection mode is imaged on the linear array of detecting elements 44 located in an image plane 48. The aperture stop 42 allows the subset of the dispersed spectrum of light in the reflection mode to pass the aperture stop 42 located in a transform plane 50. The aperture stop 42 precludes the remainder of the dispersed spectrum of light from passing the aperture stop 42. In other words, the aperture stop 42 precludes the plus one and minus one diffraction orders, $D_{+1}$ and $D_{-1}$, and higher diffraction orders from passing the aperture stop 42.

Figure 4:
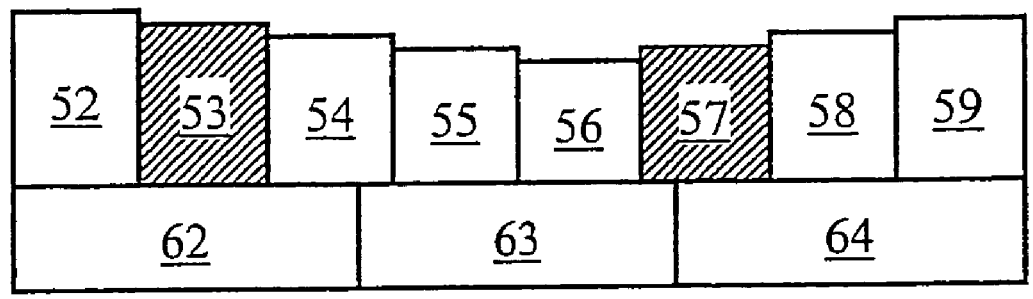
FIG. 4 schematically illustrates eight grating light valve type device pixels imaged onto three detecting elements of the present invention.

Preferably, the linear array of detecting elements 44 is arranged so that multiple pixels of the grating light valve type device 10 image onto a particular detecting element. This is schematically illustrated in FIG. 4 where first through eighth grating light valve type device pixels, 52–59, imaged onto first through third detecting elements, 62–64.

Preferably, the linear array of detecting elements 44 comprises a photodiode array detector. Alternatively, the linear array of detecting elements 44 comprises an array of photo detectors. Selection of a particular photodiode array depends upon wavelength. For near-UV to about 1.0 $\mu$m, a Si photodiode array is preferred. From about 1.0 $\mu$m to about 1.7 $\mu$m, an InGaAs photodiode array detector is preferred.

It will be readily apparent to one skilled in the art that photodiode arrays other than the Si photodiode array or the InGaAs photodiode array can be used for the linear array of detecting elements.

In operation, the pixels of the grating light valve type device 10 cycle the subset of the dispersed spectrum of light through a wavelength band of interest. The electronics 46 provide a driving signal which cycles the pixels of the grating light valve type device 10 through the wavelength band of interest. In response, the linear array of detecting elements 44 provides a detector signal to the electronics 46. The electronics 46 process the detector signal to provide wavelength composition of the wavelength band and to provide power over the wavelength band. In some situations, the wavelength band of interest is coterminous with the dispersed spectrum of light. In other situations, the wavelength band of interest is smaller than the dispersed spectrum of light.

The driving signal employs a modulation technique selected from a group comprising time division multiplex modulation, code division multiplex modulation, and a combination thereof. By employing the modulation technique to drive individual pixels of the grating light valve type device 10 with particular signals and by signal processing of a resulting detector signal, an effective sensitivity of the linear array of detecting elements 44 is enhanced. The preferred embodiment of the present invention utilizes a combination of the time division multiplex modulation and the code division multiplex modulation. Alternatively, the present invention exclusively uses the time division multiplex modulation. Further alternatively, the present invention exclusively uses the code division multiplex modulation. Each of these modulation techniques is described in detail below.

In the time division multiplex modulation, the driving signal comprises time slots for first, second, third, and nth subsets of the wavelength band. Particular wavelengths of the first through nth subsets are chosen so that the particular wavelengths illuminate different detecting elements of the linear array of detecting elements 44. Thus, for the first subset, a first wavelength illuminates a first detecting element, a second wavelength illuminates a second detecting element, and so forth. Similarly, for the second subset, a third wavelength illuminates the first detecting element, a fourth wavelength illuminates the second detecting element, and so forth.

In the code division multiplex modulation, mutually orthogonal driving signals drive each pixel of a group of the pixels of the grating light valve type device 10. In response, one or more of the detecting elements of the linear array of detecting elements 44 provides the detector signal to the electronics 46, which process the detector signal to separate the detector signal into detector signals corresponding to the mutually orthogonal driving signals. If the group comprises first, second, and third pixels driven by first, second, and third orthogonal driving signals, the linear array of detecting elements 44 will provide the detector signal comprising first, second, and third orthogonal detector signals.

The code division multiplex modulation operates using an actual signal selected from a group comprising a sinusoidal wave signal, a square wave signal, and a binary sequence signal. For the sinusoidal wave signal, each of the mutually orthogonal driving signals employ different fundamental pure sinusoidal frequencies where no fundamental frequency is an integer multiple of another. Similarly, for the square wave signal, each of the mutually orthogonal driving signals employ different fundamental square wave frequencies where no fundamental frequency is an integer multiple of another. For the binary sequence signal, each of the mutually orthogonal driving signals employ different initial seeds to generate pseudo-random sequences such as, for example, maximum length shift register sequences. Alternatively for the binary sequence signal, each of the mutually orthogonal driving signals employ different circular shifts to generate the sequences.

Figure 5:
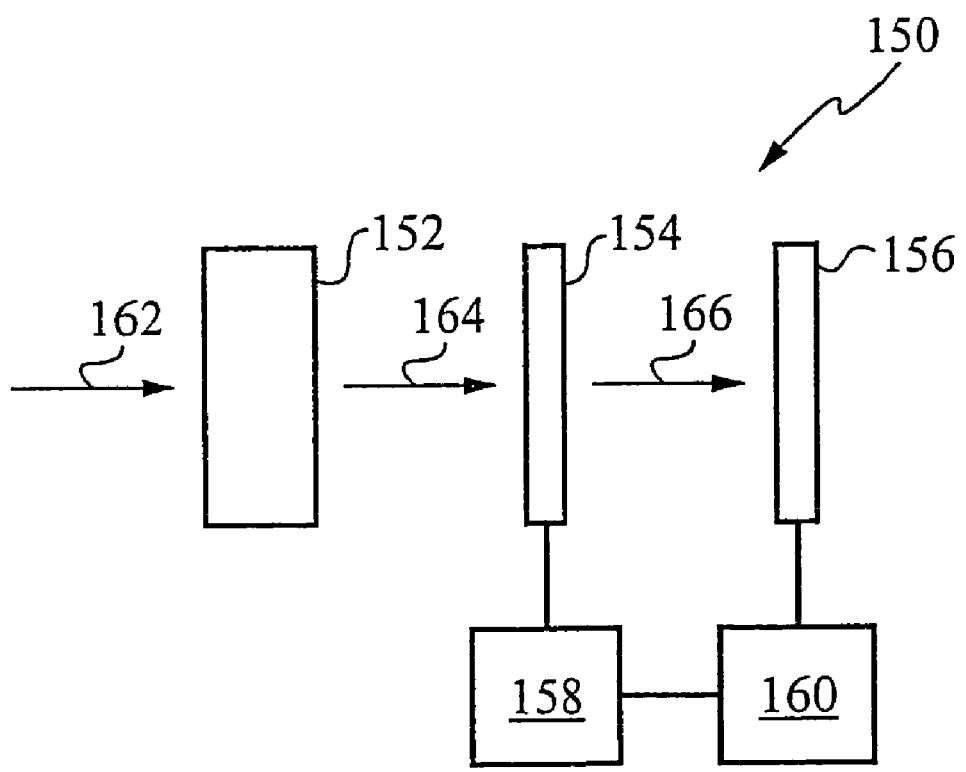
FIG. 5 schematically illustrates an embodiment of the present invention.

An embodiment of the present invention is schematically illustrated in FIG. 5. The embodiment 150 employs the code division multiplex technique of the present invention. The embodiment 150 comprises dispersion optics 152, a light modulator 154 comprising an array of light modulating pixels, an array of detecting elements 156, a modulation source 158, and a signal processor 160. The dispersion optics 152 are optically coupled to the light modulator 154. The light modulator 154 is optically coupled to the array of detecting elements 156. The modulation source 158 is electrically coupled to the light modulator 154 and to the signal processor 160. The signal processor 160 is electrically coupled to the array of detecting elements 156.

Figure 6:
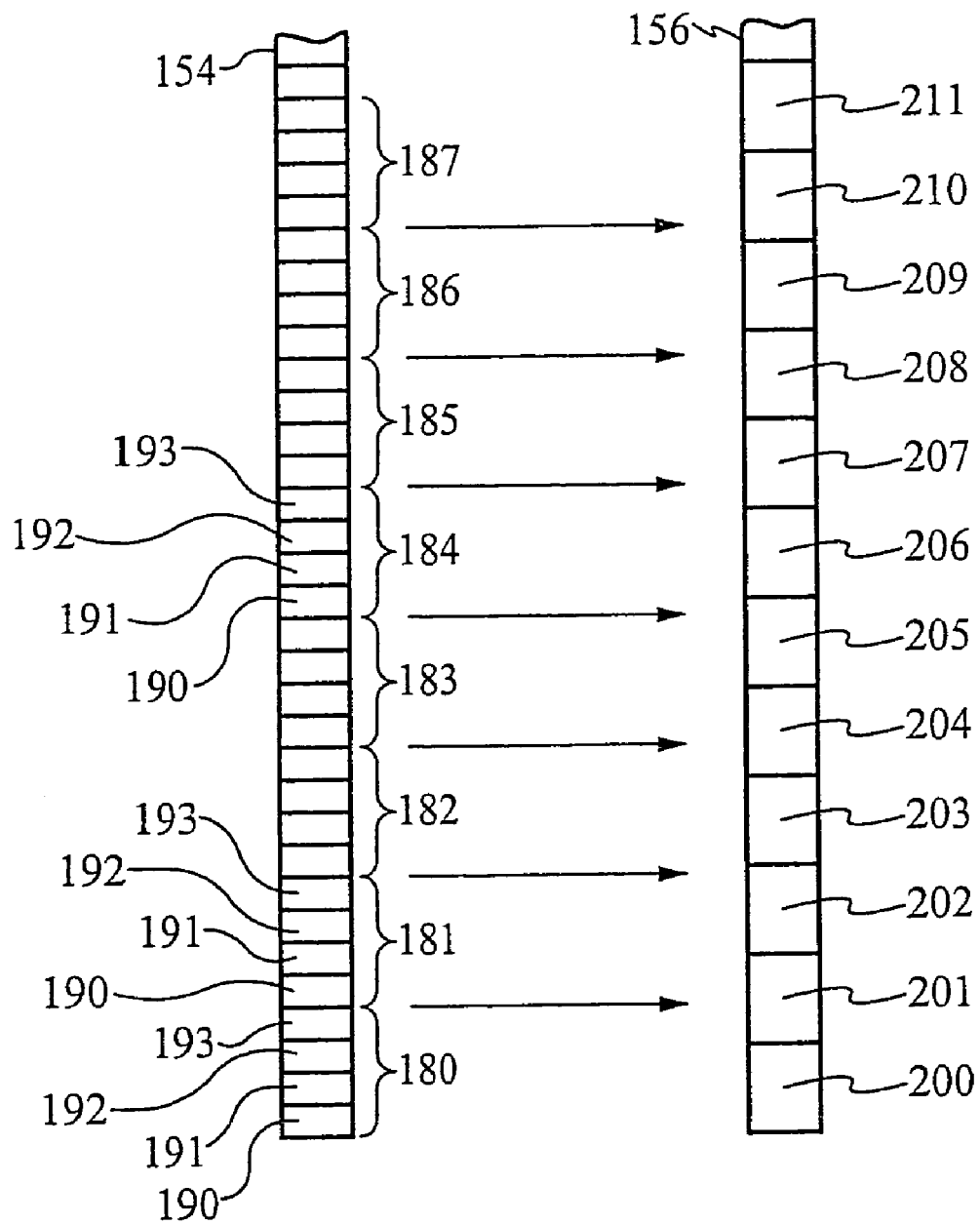
FIG. 6 schematically illustrates a light modulator and an array of detecting elements of the embodiment illustrated in FIG. 5.

Portions of the light modulator 154 and the array of detecting elements 156 are schematically illustrated in FIG. 6. The array of light modulating pixels of the light modulator 154 are arranged as first through eighth pixels groups, 180–187. Each of the first through eighth pixel groups, 180–187, comprise first through fourth pixels, 190–193. The first pixels 190 comprise a first set of pixels. The second pixels 191 comprise a second set of pixels. The third pixels 192 comprise a third set of pixels. The fourth pixels 193 comprise a fourth set of pixels. The second pixels 191 are interdigitated with the first pixels 190. The third pixels 192 and the fourth pixels 193 are also interdigitated with the first pixels 190. The array of detecting elements 156 comprises first through twelfth detecting elements, 200–211. As illustrated in FIG. 6, the first pixels 190 direct light from the light modulator 154 to the array of detecting elements 156.

Figure 7:
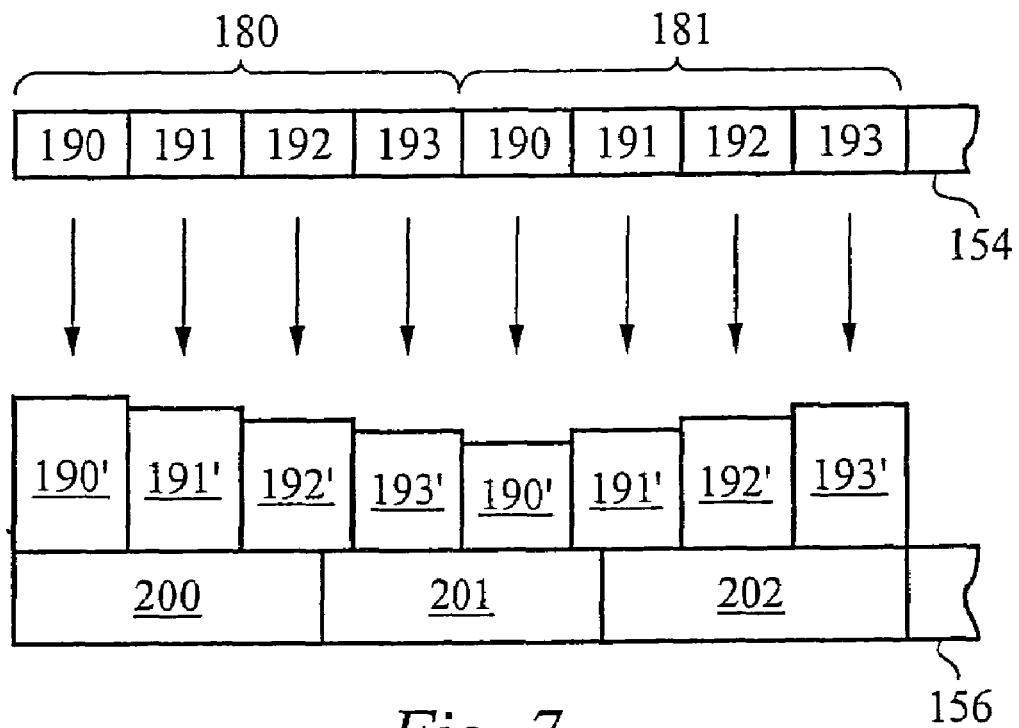
FIG. 7 schematically illustrates eight pixel intensities imaged onto three detecting elements of the embodiment illustrated in FIG. 6.

The first and second pixel groups, 180 and 181, of the light modulator 154 and the first, second, and third detecting elements, 200–202, of the array of detecting elements 156 are schematically illustrated in FIG. 7. The first pixel 190 of the first pixel group 180 images a first pixel intensity 190' onto the first detecting element 200. The second pixel 191 of the first pixel group 180 images a second pixel intensity 191' onto the first detecting element 200. The third pixel 192 of the first pixel group 180 images a third pixel intensity 192' onto the first and second detecting elements, 200 and 201. The fourth pixel 193 of the first pixel group 180 images a fourth pixel intensity 193' onto the second detecting element 201. The first pixel 190 of the second pixel group 181 images a first pixel intensity 190' onto the second detecting element 201. The second pixel 191 of the second pixel group 181 images a second pixel intensity 191' onto the second and third detecting elements, 201 and 202. The third pixel 192 of the second pixel group 181 images a third pixel intensity 193' onto the third detecting element 202. The fourth pixel 193 of the second pixel group 181 images a fourth pixel intensity 193' onto the third detecting element 202. Thus, three pixel intensities are imaged onto the first and third detecting elements, 200 and 202, while four pixel intensities are imaged onto the second detecting element 201.

It will be readily apparent to one skilled in the art that both the light modulating pixels of the light modulator 154 and the pixel intensities can be referred to as pixels. Further, it will be readily apparent to one skilled in the art that FIG. 7 schematically depicts a configuration where the array of detecting elements 156 is located at an image plane. Moreover, it will be readily apparent to one skilled in the art that if the array of detecting elements 156 is located away from the image plane, the pixel intensities would overlap neighboring pixel intensities but that this does not detrimentally affect performance of the embodiment 150.

The code division multiplexing technique of the present invention drives each of the first through fourth pixels, 190–193, with first through fourth orthogonal codes, respectively. Preferably, the first through fourth orthogonal codes comprise orthogonal maximal length sequence codes. Alternatively, the first through fourth orthogonal codes comprise orthogonal sinusoidal signals. Further alternatively, the first through fourth orthogonal codes comprise orthogonal square wave signals. The orthogonal codes fulfill an orthogonality condition. The orthogonality condition allows a single detecting element to generate a signal in response to simultaneous illumination by multiple pixels and allows the signal to be processed to discriminate each of the multiple pixels. For example, if the first through fourth orthogonal codes comprise the orthogonal sinusoidal signals, the orthogonality condition is first through fourth driving frequencies allowing the signal to be processed by first through fourth resonant circuits each tuned to one of the first through fourth driving frequencies. Preferably, in the embodiment 150, the orthogonality condition is fulfilled by maximal length sequence codes. The number of codes and the length of the codes is specific to a particular implementation.

Figure 8:
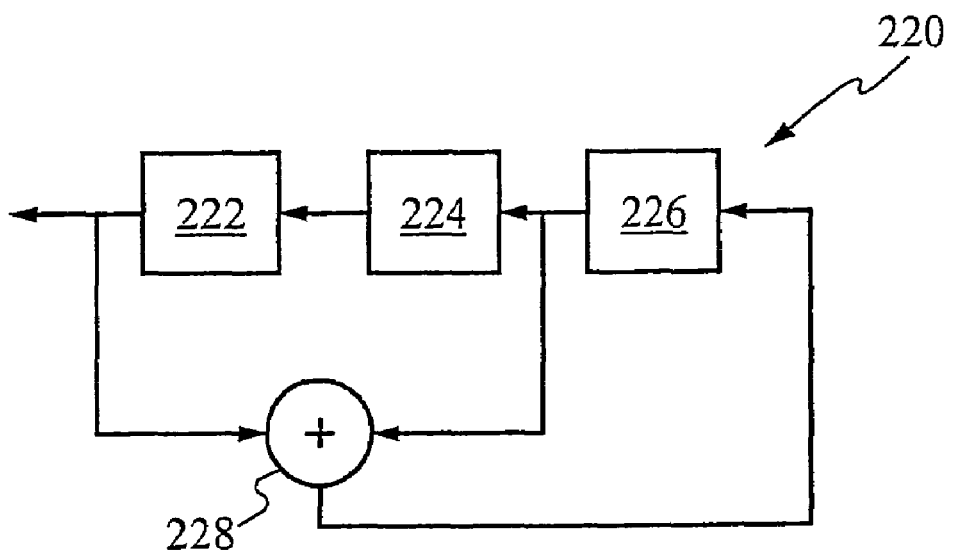
FIG. 8 schematically illustrates a seven-bit maximal length sequence generator of the embodiment illustrated in FIGS. 5–7.

A seven-bit maximal length sequence code generator of the present invention is illustrated in FIG. 8. The seven-bit maximal length sequence generator comprises first, second, and third d-flip/flops, 222, 224, and 226, and an "exclusive or" 228. Generation of a first seven-bit maximal length sequence code begins with a seed of 0 in the first and second d-flip/flops, 222 and 224, and a seed of 1 in the third d-flip/flop, which generates a first bit of 0, a second bit of 0, a third bit of 1, a fourth bit of 1, a fifth bit of 1, a sixth bit of 0, and a seventh bit of 1. Second, third, and fourth seven-bit maximal length sequence codes, which fulfill the orthogonality condition, are preferably generated by circular shifts of the first seven-bit maximal length sequence code. The first through fourth seven-bit maximal length sequence codes generated in this manner are listed as a table in FIG. 9.

In the embodiment 150, the modulation source drives the first through fourth pixels, 190–193, of the light modulator 154 with the first through fourth seven-bit maximal length sequence codes where a bit of 0 directs light away from the array of detecting elements 156 and where a bit of 1 directs light onto the array of detecting elements 156. The signal processor 160 processes the signal from each of the detecting elements of the array of detecting elements 156 to discriminate the first through fourth pixel intensities, 190'–193'. Thus, further discussion concentrates on signal processing from the first detecting element 200 illuminated by the first through third pixel intensities, 190'–192'. It will be readily apparent to one skilled in the art that it is inconsequential that the first detecting element 200 is not illuminated by the fourth pixel intensity 193'.

A table of four pixel intensities for an integration period of seven time increments of the embodiment 150 is illustrated in FIG. 10. Specifically, the first through fourth pixel intensities, 190'–193', have first through fourth bright intensities $I_A$, $I_B$, $I_C$, and $I_D$, when the first through fourth pixels, 190–193, are directed onto the first detecting element 200. The first through fourth pixel intensities, 190'–193', have first through fourth contrast ratio, $C_A$, $C_B$, $C_C$, and $C_D$ between conditions where light is directed onto the detecting element 200 and where light is directed away from the detecting element 200. When the first through fourth pixels, 190–193, are directed away from the first detecting element 200, the first detecting element 200 detects first through fourth dark intensities, $I_A/C_A$, $I_B/C_B$, $I_C/C_C$, and $I_D/C_D$.

In the embodiment 150, an integration period comprises first through seventh time increments, $t_1$–$t_7$. The first pixels 190 are driven by the first maximal length sequence code. For the first time increment $t_1$, the first detecting element 200 detects the first dark intensity $I_A/C_A$. For the second time increment $t_2$, the first detecting element 200 detects the first dark intensity $I_A/C_A$. For the third time increment $t_3$, the first detecting element 200 detects the first bright intensity $I_A$. For the fourth time increment $t_4$, the first detecting element 200 detects the first bright intensity $I_A$. For the fifth time increment $t_5$, the first detecting element 200 detects the first bright intensity $I_A$. For the sixth time increment $t_6$, the first detecting element 200 detects the first dark intensity $I_A/C_A$. For the seventh time increment $t_7$, the first detecting element 200 detects the first bright intensity $I_A$. Similarly, the second, third, and fourth pixels, 191, 192, and 193, are driven by the second, third, and fourth seven-bit maximal length sequence codes. The first detecting element 200 detects second, third, and fourth bright intensities, $I_B$, $I_C$, and $I_D$, and second, third, and fourth dark intensities, $I_B/C_B$, $I_C/C_C$, and $I_D/C_D$, according to the second, third, and fourth seven-bit maximal length sequence codes. The first through fourth pixel intensities, 190'–193', and detector intensities, $I_1$–$I_7$ detected by the detecting element 200 for the first through seventh time increments, $t_1$–$t_7$, are listed as a table in FIG. 10.

In the embodiment 150, the signal processor 160 processes the signal from the detecting element 200 as first through fifth equations having first through fifth unknowns. The first through fourth unknowns are the first, second, third, and fourth bright intensities, $I_A$, $I_B$, $I_C$, and $I_D$. The fifth unknown is a dark term, which is a sum of the first, second, third, and fourth dark intensities.

With reference to the table of FIG. 10, the first equation sums detector intensities where the first pixel intensity 190' is the first bright intensity $I_A$ and subtracts detector intensities where the first pixel intensity 190' is the first dark intensity $I_A/C_A$. In other words, the first equation sums the detector intensities for the third, fourth, fifth, and seventh time increments, $t_3$, $t_4$, $t_5$, and $t_7$, and subtracts the detector intensities for the first, second, and sixth time increments, $t_1$, $t_2$, and $t_6$. This gives the first equation as:

$$-I_1-I_2+I_3+I_4+I_5-I_6+I_7=4I_A(C_A-1)/C_A+(I_A/C_A+I_B/C_B+I_C/C_C+I_D/C_D).$$

An equation can be similarly generated for each pixel 191', 192', and 193'. The fifth equation is generated by adding the detector intensities for all seven detector time increments, which estimates the common dark intensity term. Using the five equations, the example five pixel intensities can be found.

Figure 11A:
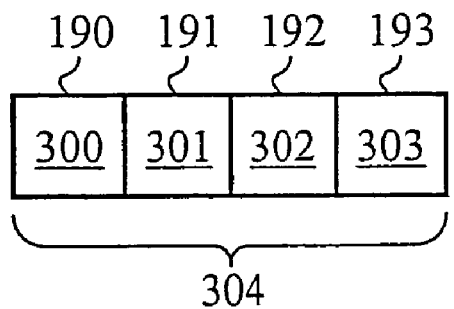
FIGS. 11A, 11B, and 11C schematically illustrate the embodiment illustrated in FIGS. 5–10, the preferred embodiment, and an alternative embodiment employing a second combination of modulation techniques, respectively.

In the embodiment 150, which employs the code division multiplex technique, first through fourth pixels, 190–193, are driven by the first through fourth orthogonal codes, 300–303, which is schematically illustrated in FIG. 11A as occurring over a first time slot 304.

Figure 11B:
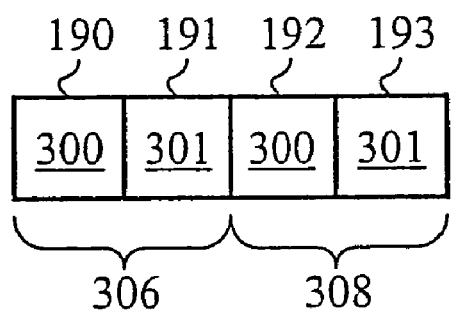

A preferred embodiment of the present invention is schematically illustrated in FIG. 11B. The preferred embodiment employs a combination of the code division multiplex technique and the time division multiplex technique. In the preferred embodiment, the first and second pixels, 190 and 191, are driven with the first and second orthogonal codes, 300 and 301, for a second time slot 306. Then, the third and fourth pixels, 192 and 193, are driven with the first and second orthogonal codes, 300 and 301 for a third time slot 308.

Figure 12:
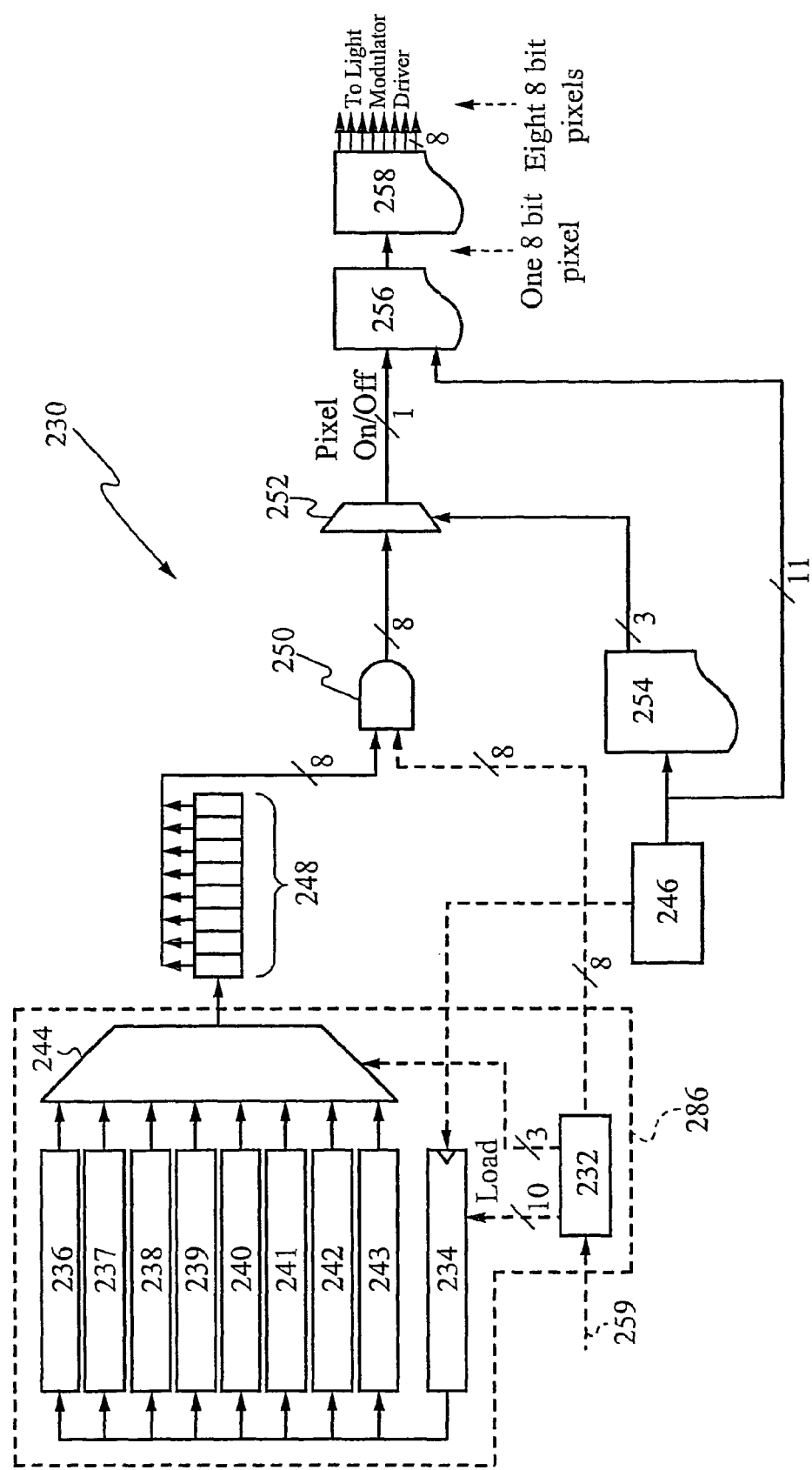
FIG. 12 schematically illustrates an exemplary modulation source of the embodiment illustrated in FIG. 5.
Figure 13:
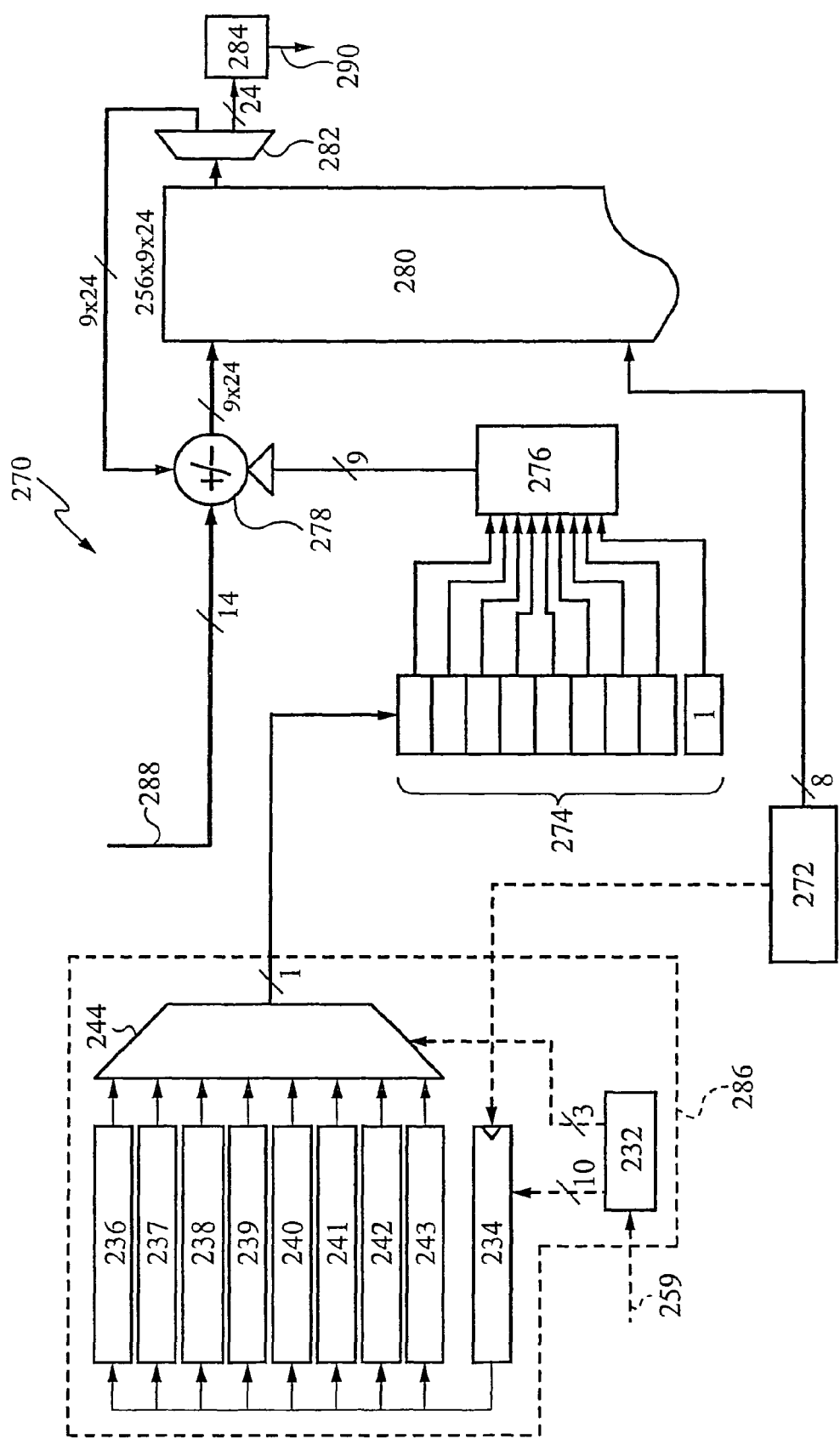
FIG. 13 schematically illustrates an exemplary signal processor of the embodiment illustrated in FIG. 5.

An implementation of the grating light valve type device modulator circuit for maximal length sequence codes is shown in FIG. 12. An implementation for the corresponding photodetector demodulator circuit is shown in FIG. 13. The logic of these circuits can be implemented in hardware or carried out in software by a processor. If the circuits are implemented in hardware, the processor can be simpler or can be allocated to other tasks.

An exemplary modulation source of the present invention is schematically illustrated in FIG. 12. The modulation source 230 comprises a control register 232, a code counter 234, first through eighth code generators, 236–243, a first multiplexer 244, a pixel counter 246, a first code shift register 248, an AND-gate 250, a second multiplexer 252, a modulator pixel table 254, a calibration table 256, and an output buffer 258.

In the modulation source 230, the control register couples to the code counter 234, the first multiplexer 244, and the AND-gate 250. The code counter 234 couples to the first through eighth code generators, 236–243, which couple to the first multiplexer 244. The first multiplexer 244 couples to the first code register 248, which couples to the AND-gate 250, which couples to the second multiplexer 252. The pixel counter 246 couples to the code counter 234 and the modulator pixel table 254. The modulator pixel table 254 couples to the second multiplexer 252 and the calibration table 256.

The second multiplexer 252 couples to the calibration buffer 256, which couples to the output buffer 258.

The first through eighth code generators, 236–243, provide different driving codes. For example, the first code generator 236 could be a seven-bit maximal length sequence generator, the second code generator 237 could be a fifteen-bit maximal length sequence generator, etc. In operation, the control register 232 receives a control signal 259 from a control processor. The control register 232 and the first multiplexer 244 choose one of the first through eighth code generators to provide a driving code while the control register 232 via the code counter 234 drives the chosen code generator. For code division multiplexing, the first code register 248 receives one bit and shifts the other bits to the right, and provides the bits to the AND-gate 250. For time division multiplexing, the control register 232 provides bit values to the AND-gate 250 so that 8 bits are provided by the AND-gate 250 to the second multiplexer 252, which in turn provides the 8 bits one at a time to calibration table 256. The pixel counter 246 coordinates the driving signals, via the code counter 234, via the modulator pixel table 254, and directly to the calibration table 256. The calibration table 256 adjusts the driving signal, according to a modulator pixel calibration, and sends the adjusted driving signal to the output buffer 258, which preferably provides eight-bit driving signals to the light modulator 154 (FIG. 6) eight pixels at a time. Alternatively, the output buffer 258 provides longer or shorter driving signals than the eight-bit driving signals. Further alternatively, the output buffer 258 provides the driving signals to more or less than the eight pixels at a time.

An example photodetector demodulator of the present invention is schematically illustrated in FIG. 13. The signal processor 270 is intended to operate in conjunction with the modulation source 250 (FIG. 12). The signal processor 270 comprises a detector counter 272, a second code register 274, an enable/disable control 276, an accumulator 278, an accumulator memory 280, a demultiplexer 282, and a processor 284. A code generation block 286 of the modulation source 250 (FIG. 12) couples to the signal processor 270. The code generation block 286 comprises the control register 232, the code counter 234, the first through eighth code generators, 236–243, and the first multiplexer 244.

The detector counter 272 couples to the code counter 234 of the code generation block 286. The first multiplexer 244 of the code generation block 286 couples to the second code register 274, which couples to the enable/disable control 276, which couples to the accumulator 278, which couples to the accumulator memory 280. The detector counter 272 couples to the accumulator memory 280, which couples to the demultiplexer 282. The demultiplexer 282 couples to the accumulator 278 and the processor 284.

In operation, the second code register 274 receives the driving codes which are used by the enable/disable control 276 to determine whether pixel intensities from individual detectors of the array of detecting elements 156 (FIG. 6) are added or subtracted. An extra slot in the second code register 274 always provides a 1 bit value for the sum of detector intensities for all time increments over the integration period. The detector signal 288 couples to the accumulator 278 and is sent to the accumulator memory with results from control 276 indicating whether detector intensities for particular time increments are to be added or subtracted in accordance with the driving codes, which begins forming pre-processed detector data. The accumulator 278, the accumulator memory 280, and the demultiplexer 282 cycle through portions of the detector signal 288 until all of the detecting elements of the array of detecting elements 156 (FIG. 6) provide detector intensities for the integration period, which finishes forming the pre-processed detector data. The accumulator memory 280, via the demultiplexer 282, sends pre-processed detector data to the processor 284, which performs appropriate scaling. The processor 284 provides an output 290 indicating power versus wavelength.

Figure 11C:
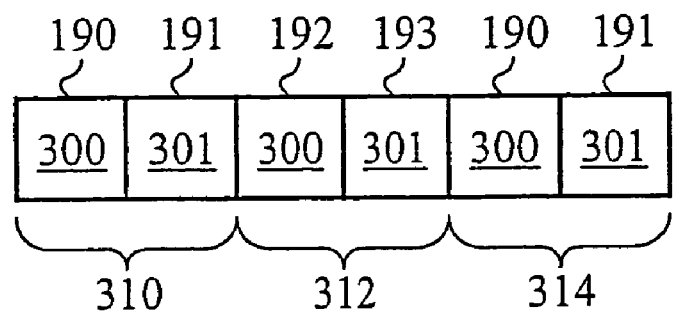

An alternative embodiment employing a second combination of the code division multiplex technique and the time division multiplex technique is illustrated in FIG. 11C. In this alternative embodiment, the first and second pixels, 190 and 191, are driven with the first and second orthogonal codes, 300 and 301, for a fourth time slot 310. Then, the third and fourth pixels, 192 and 193, are driven with the first and second orthogonal codes, 300 and 301, for a fifth time slot 312. Following this, the first and second pixels, 190 and 191, are driven with the first and second orthogonal codes, 300 and 301, in order to provide a more accurate analysis of the first and second pixels, 190 and 191.

Figure 14A:
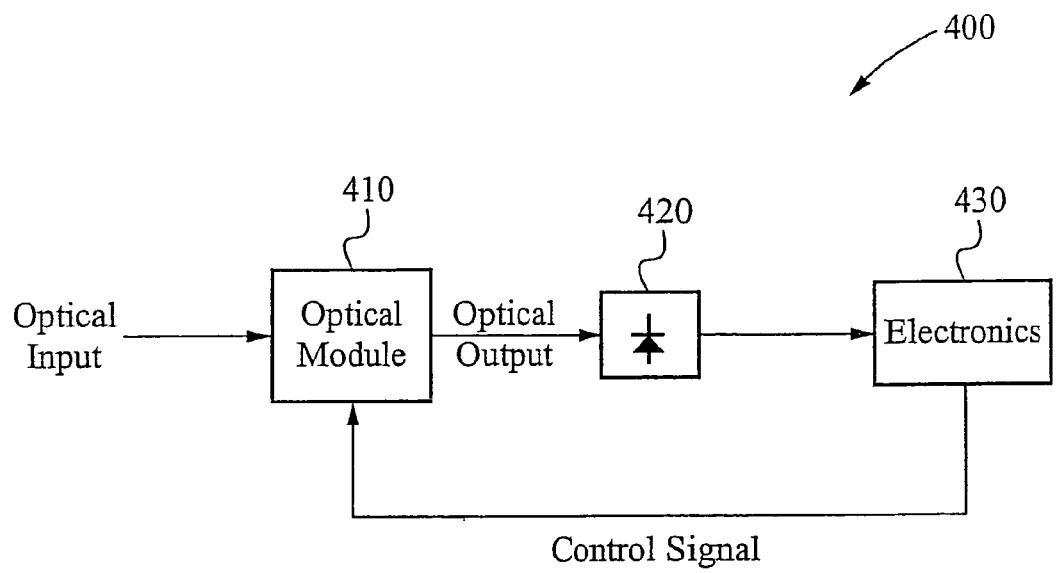
FIG. 14A illustrates a block diagram of a first alternative embodiment of the present invention.

In a first alternative embodiment of the present invention, the number of detector elements in the photodetector array is reduced to one. A block diagram of the first alternative embodiment 400 is illustrated in FIG. 14A. The first alternative embodiment 400 includes an optical module 410, a single photodetector 420 and electronics 430. The optical module 410 is coupled to the single photodetector 420. The single photodetector 420 is coupled to the electronics 430. The electronics 430 is coupled to the optical module 410. The electronics 430 includes a signal processing circuit which utilizes a signal processing algorithm, and provides control signals to the optical module 410. The optical module 410 receives an optical input, and according to the control signals provided by the electronics 430, preferably outputs one channel at a time while blocking all others. Alternatively, a group of channels can be selectively output by the optical module 410 using code division multiplex. The output channel is directed from the optical module 410 to the single photodetector 420. The single photodetector 420 provides a detector signal to the electronics 430. The electronics 430 provides the control signals to the optical module 410 to pass one channel at a time, collects and records the photo-detector current from the single photodetector 420, and strobes this procedure across the wavelength band under consideration. Preferably, the optical module 410 passes a zero order light associated with the selected channel, and the zero order light is directed to the single photodetector 420. Alternatively, the optical module 410 passes a first order light associated with the selected channel, and the first order light is directed onto the single photodetector 420.

Figure 14B:
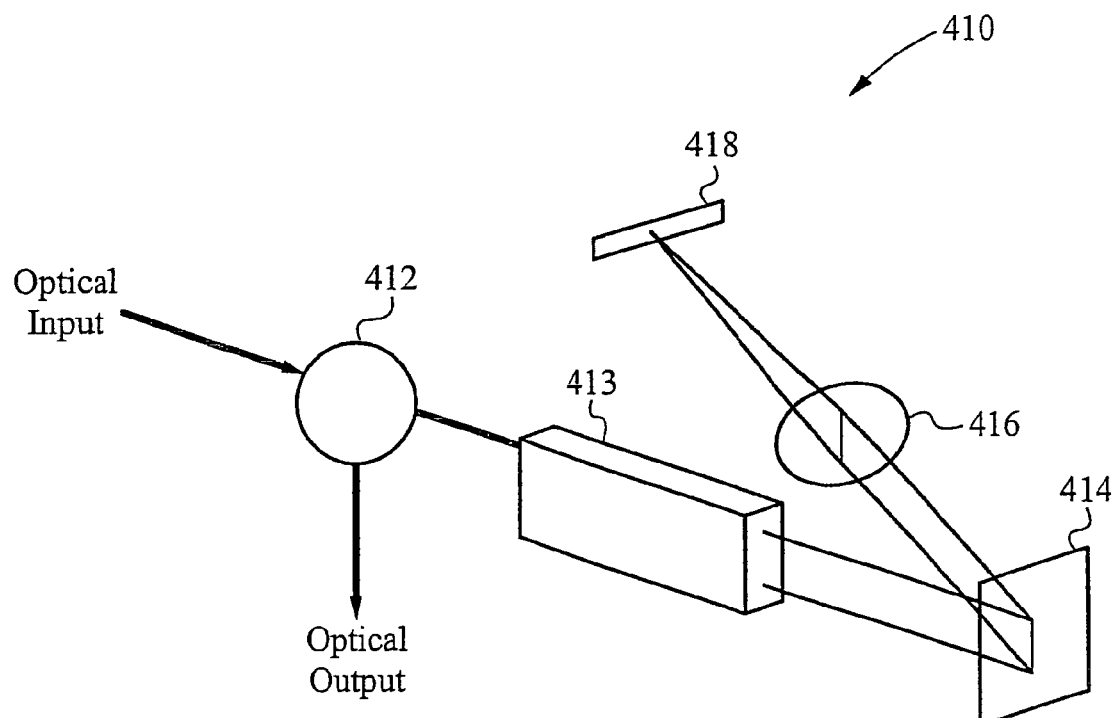
FIG. 14B illustrates an internal layout of an optical module within the first alternative embodiment.

A preferred internal layout of the optical module 410 is illustrated in FIG. 14B. The optical module 410 comprises a circulator 412, a polarization diversity (PD) module 413, a diffraction grating 414, a transform lens 416, and a grating light valve type device 418. The PD module 413 couples the circulator 412 to the diffraction grating 414. The transform lens 416 couples the diffraction grating 414 to the grating light valve type device 418. Preferably, a transform lens focal length $f_t$, separates the diffraction grating 414 from the transform lens 416. Preferably, the transform lens focal length ft separates the transform lens 416 from the grating light valve type device 418. The grating light valve type device 418 is positioned perpendicular to the optical axis.

The resolution of the wavelength step is determined by the spectral extent across a single grating light valve type device ribbon pair. Additionally, error due to polarization dependent loss is small, as the optical module 410 preferably employs polarization diversity, as described in co-pending U.S. application Ser. No. 10/318,658, filed on Dec. 12, 2002, and entitled "Apparatus for Selectively Blocking WDM Channels", which is hereby incorporated by reference.

In operation, the optical module 410 can select a single optical channel to be monitored, or a group of channels, and label them by applying a unique modulation signature to a set of ribbons on the grating light valve type device 418 onto which the selected optical channel impinges. This unique modulation signature allows the channels to physically overlap on the single photodetector 420 yet still remain distinguishable. In this way, high-speed detection of a grating spectrograph is maintained while simultaneously achieving the spectral resolution and photodetection sensitivity of a mechanically scanned grating monochromator or Michelson interferometer.

Figure 15:
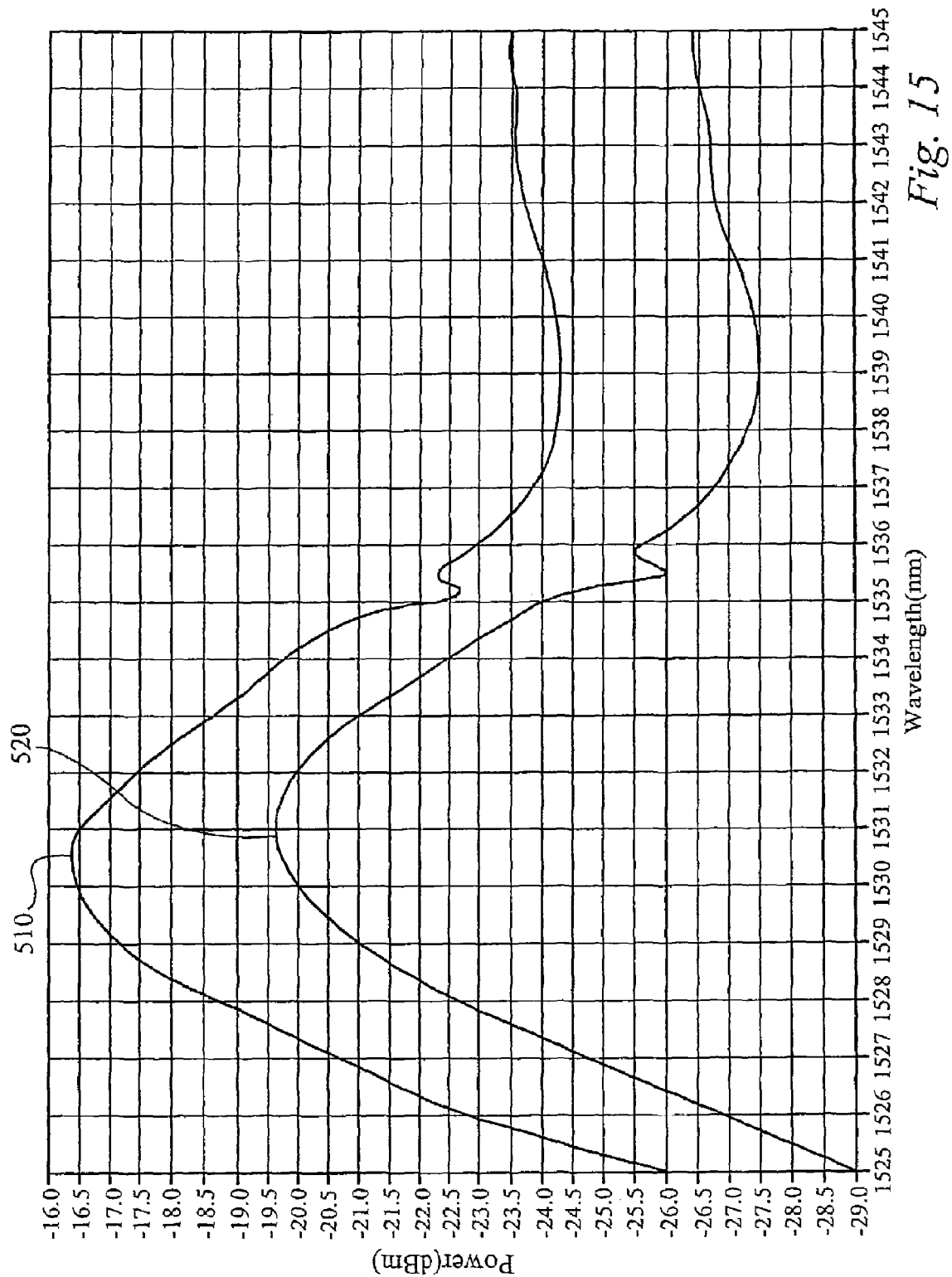
FIG. 15 illustrates a graph of a monitored spectrum of light using the first alternative embodiment versus the same profile gathered with a commercially available laboratory optical spectrum analyzer.

Using the single photodetector embodiment illustrated in FIG. 14A, laboratory data has been collected to demonstrate the effectiveness of using the first alternative embodiment 400 to monitor a spectrum of light in the 1.55 um region. FIG. 15 illustrates a graph of a monitored spectrum of light, curve 510, using the first alternative embodiment versus the same profile gathered with a commercially available laboratory optical spectrum analyzer, curve 520.

The preferred embodiment illustrated in FIG. 3 is preferably used in applications where high levels of optical power must be detected and analyzed rapidly, as the photodector array of the preferred embodiment can process higher levels of total spectral power than can a single high-speed photodiode of the first alternative embodiment 400 illustrated in FIG. 14A.

In a second alternative embodiment of the present invention, the aperture stop 42 of the preferred embodiment 30 (FIG. 3) is replaced by an alternative aperture stop. The alternative aperture stop prevents the reflected light R from reaching the linear array of detecting elements 44 while allowing diffracted light to reach the linear array of detecting elements 44.

Figure 16:
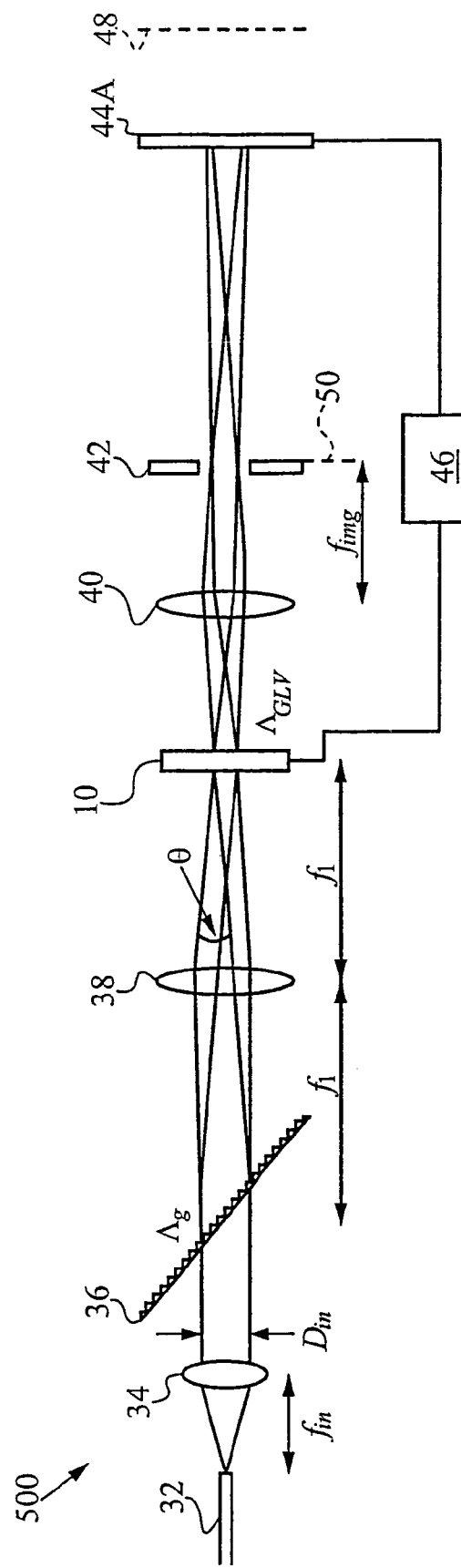
FIG. 16 illustrates a third alternative embodiment of the present invention.

A third alternative embodiment 500 of the present invention is illustrated in FIG. 16. In the third alternative embodiment 500, the linear array of detecting elements 44 of the preferred embodiment 30 (FIG. 3) is replaced by a second alternative linear array of detecting elements 44A. In the third alternative embodiment 500, the second alternative linear array of detecting elements 44A preferably occupies a position located between the image plane 48 and the transform plane 50. Alternatively, in the third alternative embodiment 500, the second alternative linear array of detecting elements 44A occupies a position located beyond the image plane 48.

In general, the number of detector elements can be one or more than one. The number of detector elements can also be fewer than, equal to, or greater than the number of grating light valve type device pixels. The number of detector elements effects the tradeoff of time and code division multiplex modulation drive signals and detector signal demodulation through the detector size, the detector saturation level, and the overlap of light from neighboring grating light valve type device pixels onto the same detector element. For example, grating light valve type device pixels 54 and 57 (FIG. 4) cannot be modulated with the same signal at the same time because both excite detector 63. If pixels 54 and 57 are both driven at the same time, different drive signals are needed. Alternatively, the same drive signal can be used but at different times. Since pixels 53 and 57 do not both excite the same detector, pixels 53 and 57 can be driven with the same signal at the same time.

Use of the grating light valve type device 10 in conjunction with the modulation technique leads to improved measurement of the wavelengths within the wavelength band and to improved measurement of the power over the wavelength band. Because of a controllability of the elongated elements 12 (FIGS. 1, 2A, and 2B), the grating light valve type device 10 accurately places light into the reflection mode, the diffraction mode, or a combination thereof for specific wavelengths. Because of a fast response time of the elongated elements 12, the grating light valve type device 10 operates with a high switching speed, typically in the kHz to MHz range. This separates a noise bandwidth (low frequency) from a modulation frequency and, consequently, a detection signal frequency (i.e., frequencies in the kHz to MHz range). Further, the grating light valve type device 10 operates to attenuate particular wavelengths if the particular wavelengths cause power saturation of particular detecting elements of the linear array of detecting elements 44. Thus, the grating light valve type device 10 produces greater dynamic range. Additionally, the modulation technique enhances the effective sensitivity of the linear array of detecting elements 44. Moreover, because a signal detection frequency lies in the kHz to MHz range, 1/f noise and drift are effectively avoided. Plus, because drift occurs relatively slowly compared to the modulation technique, the modulation technique allows for drift compensation. These factors enhance detection sensitivity and accuracy.

Thus, the preferred embodiment 30 provides stable, sensitive, measurements of closely spaced wavelengths and their associated powers because of at least four aspects of the present invention. The first aspect is the accuracy and the switching speed of the grating light valve type device 10. The second aspect is the enhanced effective sensitivity of the linear array of detecting elements 44 provided by the modulation technique. The third aspect is the filtering of the 1/f noise provided by the modulation technique. The fourth aspect is the drift compensation provided by the modulation technique.

It will be readily apparent to one skilled in the art that other various modifications may be made to the embodiments without departing from the spirit and scope of the invention as defined by the appended claims.

We claim:

1. An apparatus for measuring wavelength composition of a dispersed spectrum of light comprising:
    a diffractive light modulator comprising an array of light modulating pixels operable in a first mode and a second mode such that in operation the dispersed spectrum of light illuminates the diffractive light modulator along the array of light modulating pixels and further such that in operation the diffractive light modulator selectively directs a subset of the dispersed spectrum of light into the first mode while directing a remainder of the dispersed spectrum of light into the second mode;
    a detector coupled to the diffractive light modulator such that in operation the detector detects the subset of the dispersed spectrum of light while not detecting the remainder of the dispersed spectrum of light, wherein the detector comprises an array of detecting elements;
    an imaging lens, the imaging lens optically coupling the diffractive light modulator to the detector; and
    an aperture stop located between the imaging lens and the array of detecting elements such that in operation the aperture stop allows the first mode to pass the aperture stop while not allowing the second mode to pass the aperture stop.

2. The apparatus of claim 1 wherein the aperture stop is located about a transform plane of the imaging lens.

3. An apparatus for measuring wavelength composition of a dispersed spectrum of light comprising:
    a diffractive light modulator comprising an array of light modulating pixels operable in a first mode and a second mode such that in operation the dispersed spectrum of light illuminates the diffractive light modulator along the array of light modulating pixels and further such that in operation the diffractive light modulator selectively directs a subset of the dispersed spectrum of light into the first mode while directing a remainder of the dispersed spectrum of light into the second mode;
    a detector coupled to the diffractive light modulator such that in operation the detector detects the subset of the dispersed spectrum of light while not detecting the remainder of the dispersed spectrum of light; and
    electronics such that in operation the electronics provide a driving signal for the diffractive light modulator and further such that in operation the detector provides a detector signal to the electronics, wherein the driving signal comprises a time division driving signal.

4. An apparatus for measuring wavelength composition of a dispersed spectrum of light comprising:
    a diffractive light modulator comprising an array of light modulating pixels operable in a first mode and a second mode such that in operation the dispersed spectrum of light illuminates the diffractive light modulator along the array of light modulating pixels and further such that in operation the diffractive light modulator selectively directs a subset of the dispersed spectrum of light into the first mode while directing a remainder of the dispersed spectrum of light into the second mode;
    a detector coupled to the diffractive light modulator such that in operation the detector detects the subset of the dispersed spectrum of light while not detecting the remainder of the dispersed spectrum of light; and
    electronics such that in operation the electronics provide a driving signal for the diffractive light modulator and further such that in operation the detector provides a detector signal to the electronics, wherein the driving signal comprises a code division of driving signal.

5. An apparatus for measuring wavelength composition of a dispersed spectrum of light comprising:
    a diffractive light modulator comprising an array of light modulating pixels operable in a first mode and a second mode such that in operation the dispersed spectrum of light illuminates the diffractive light modulator along the array of light modulating pixels and further such that in operation the diffractive light modulator selectively directs a subset of the dispersed spectrum of light into the first mode while directing a remainder of the dispersed spectrum of light into the second mode;
    a detector coupled to the diffractive light modulator such that in operation the detector detects the subset of the dispersed spectrum of light while not detecting the remainder of the dispersed spectrum of light; and
    electronics such that in operation the electronics provide a driving signal for the diffractive light modulator and further such that in operation the detector provides a detector signal to the electronics, wherein the driving signal comprises a combination of a time division driving signal and a code division driving signal such that the driving signals are orthogonal.

6. An apparatus for measuring wavelength composition of a dispersed spectrum of light comprising:

a diffractive light modulator comprising an array of light modulating pixels operable in a first mode and a second mode such that in operation the dispersed spectrum of light illuminates the diffractive light modulator along the array of light modulating pixels and further such that in operation the diffractive light modulator selectively directs a subset of the dispersed spectrum of light into the first mode while directing a remainder of the dispersed spectrum of light into the second mode;

a detector coupled to the diffractive light modulator such that in operation the detector detects the subset of the dispersed spectrum of light while not detecting the remainder of the dispersed spectrum of light, wherein the detector comprises a detecting element;

a dispersion device;

a transform lens optically coupling the dispersion device to the diffractive light modulator such that in operation the dispersion device diffracts a beam of light, thereby forming a diffracted beam of light, and further such that in operation the transform lens focuses the diffracted beam of light along the diffractive light modulator, thereby forming the dispersed spectrum of light; and a polarization diversity module coupled such that in operation the polarization diversity module receives the light beam as an input signal before the light beam is provided to the dispersion device.

7. The apparatus of claim 6 wherein the light beam comprises one or more optical channels.

8. An apparatus for analyzing a spectrum of light comprising:

an optical module comprising:
a light modulator comprising an array of pixels, the array of pixels comprising a first pixel and a second pixel where the first and second pixels are independently operable to direct light into first and second modes;
dispersion optics coupled to the light modulator such that in operation the dispersion optics disperse the spectrum of light along the light modulator, and
a polarization diversity module coupled such that in operation the polarization diversity module receives a light beam as an input signal before the light beam is provided to the dispersion device;

a modulation source coupled to the light modulator such that in operation the modulation source drives the first pixel with a first orthogonal code and drives the second pixel with a second orthogonal code;

a detector optically coupled to the light modulator such that in operation the detector generates a signal in response to light from the first and second pixels; and a signal processor coupled to the modulation source and the detector such that in operation the signal processor receives the signal from the detector and analyze the signal using an orthogonality condition between the first and second orthogonal codes to distinguish light illuminating the first pixel from light illuminating the second pixel.

9. The apparatus of claim 8 wherein the first mode comprises a reflection mode and the second mode comprises a diffraction mode.

10. The apparatus of claim 8 wherein the first mode comprises a diffraction mode and the second mode comprises a reflection mode.

11. The apparatus of claim 8 wherein the first and second modulation codes comprise an orthogonal time division multiplex modulation.

12. The apparatus of claim 8 wherein the first and second modulation codes comprise an orthogonal code division multiplex modulation or a combination of time and code division multiplex modulation.

13. An apparatus for analyzing a spectrum of light comprising:

a light modulator comprising an array of pixels, the array of pixels comprising first pixels interdigitated with second pixels where the first and second pixels are independently operable to direct light into first and second modes;

dispersion optics coupled to the light modulator such that in operation the dispersion optics disperse the spectrum of light along the light modulator;

a modulation source coupled to the light modulator such that in operation the modulation source drives the first pixels with a first orthogonal code and drives the second pixels with a second orthogonal codes;

an array of detecting elements coupled to the light modulator such that in operation the light modulator directs the first mode from the first and second pixels onto the array of detecting elements while directing the second mode from the first and second pixels away from the array of detecting elements and further such that in operation the array of detecting elements generates a signal in response to light from the first and second pixels; and a signal processor coupled to the modulation source and the array of detecting elements such that in operation the signal processor receives the signal from the array of detecting elements and analyzes the signal using an orthogonality condition between the first and second orthogonal codes to distinguish light illuminating the first pixels from light illuminating the second pixels.

14. The apparatus of claim 13 wherein the spectrum of light comprises a wavelength division multiplexed signal comprising a plurality of wavelength signals.

15. The apparatus of claim 13 wherein the light modulator comprises a diffractive light modulator.

16. The apparatus of claim 15 wherein the diffractive light modulator comprises grating light valve type device.

17. The apparatus of claim 15 wherein the first mode comprises a reflection mode and the second mode comprises a diffraction mode.

18. The apparatus of claim 15 wherein the first mode comprises a diffraction mode and the second mode comprises a reflection mode.

19. The apparatus of claim 13 further comprising an imaging lens coupling the light modulator to the array of detecting elements.

20. The apparatus of claim 19 further comprising an aperture stop optically located at a transform plane between the imaging lens and the array of detecting elements.

21. The apparatus of claim 19 wherein the array of detecting elements is located at about an image plane of the imaging lens.

22. The apparatus of claim 19 wherein the array of detecting elements is located away from an image plane of the imaging lens.

23. The apparatus of claim 13 wherein the dispersion optics comprise a dispersion device and transform lens, and further wherein the transform lens couples the dispersion device to the light modulator.

24. The apparatus of claim 23 wherein the dispersion device comprises a grating.

25. The apparatus of claim 23 wherein the dispersion device comprises a prism.

26. The apparatus of claim 23 wherein the dispersion device comprises a grism.

27. The apparatus of claim 13 wherein the light modulator further comprises third pixels interdigitated with the first pixels such that each of the first pixels is bordered by one of the second pixels and further such that each of the second pixels is bordered by one of the third pixels.

28. The apparatus of claim 27 wherein the light modulator further comprises fourth pixels interdigitated with the first pixels such that each of the third pixels is bordered by one of the fourth pixels.

29. The apparatus of claim 13 wherein the first and second modulation codes comprise an orthogonal time division multiplex modulation.

30. The apparatus of claim 13 wherein the first and second modulation codes comprise an orthogonal code division multiplex modulation or a combination of time and code division multiplex modulation.

31. The apparatus of claim 13 wherein the first modulation code and the second modulation code comprise the same code.

32. The apparatus of claim 31 wherein the modulation code is selected fro the group consisting of time division multiplex modulation and code division multiplex modulation.

33. A method of analyzing a spectrum of light comprising the steps of:
dispersing the spectrum of light along a light modulator, the light modulator comprising an array of pixels including a first pixel and a second pixel;
driving the first pixel with a first orthogonal code, the first orthogonal code including a first mode where the first mode directs light illuminating the first pixel onto a light detector, the first orthogonal code further including a second mode where the second mode directs the light illuminating the first pixel away from the light detector;
driving the second pixel with a second orthogonal code, the second orthogonal code including the first mode where the first mode directs light illuminating the second pixel onto the light detector, the second orthogonal code further including the second mode where the second mode directs the light illuminating the second pixel away from the light detector;
generating a signal from the light detector detecting light from the first and second pixels; and
processing the signal from the light detector using an orthogonality condition between the first and second orthogonal codes to provide an analysis of the spectrum of light where the analysis distinguishes light illuminating the first pixel from light illuminating the second pixel.

34. A method of analyzing a spectrum of light comprising the steps of:
dispersing the spectrum of light along a light modulator, the light modulator comprising an array of pixels including first pixels interdigitated with second pixels;
driving the first pixels with a first orthogonal code, the first orthogonal code including a first mode where the first mode directs light illuminating the first pixels onto an array of detecting elements, the first orthogonal code further including a second mode where the second mode directs the light illuminating the first pixels away from the array of detecting elements;
driving the second pixels with a second orthogonal code, the second orthogonal code including the first mode where the first mode directs light illuminating the second pixels onto the array of detecting elements, the second orthogonal code further including the second mode where the second mode directs the light illuminating the second pixels away from the array of detecting elements;
generating a signal from the array of detecting elements detecting light from the first and second pixels; and
processing the signal from the array of detecting elements using an orthogonality condition between the first and second orthogonal codes to provide an analysis of the spectrum of light where the analysis distinguishes light illuminating the first pixels from light illuminating the second pixels.

35. The method of claim 34 wherein the spectrum of light comprises a wavelength division multiplexed signal comprising a plurality of wavelength signals.

36. The method of claim 34 wherein the first orthogonal codes is modulated to attenuate an intensity of the first mode of the first pixels and to increase a dynamic range of the first pixels.

37. The method of claim 36 wherein the second orthogonal code is modulated to attenuate an intensity of the first mode of the second pixels and to increase a dynamic range of the second pixels.

38. The method of claim 34 wherein the light modulator further comprises third pixels interdigitated with the first pixels such that each of the first pixels is bordered by one of the second pixels and further such that each of the second pixels is bordered by one of the third pixels.

39. The method of claim 38 further comprising the step of driving the third pixels with a third orthogonal code, the third orthogonal code including the first mode where the first mode directs light illuminating the third pixels onto the array of detecting elements, the third orthogonal code further including the second mode where the second mode directs the light illuminating the third pixels away from the array of detecting elements.

40. The method of claim 39 wherein the step of generating the signal from the array of detecting elements includes detecting light from the third pixels.

41. The method of claim 40 wherein the step of processing the signal uses a second orthogonality condition between the first, second, and third orthogonal codes.

42. The method of claim 38 wherein the light modulator further comprises fourth pixels interdigitated with the first pixels such that each of the third pixels is bordered by one of the fourth pixels.

43. The method of claim 34 further comprising the step of separately driving the first pixels after driving the first and second pixels with the first and second orthogonal codes in order to provide a more detailed analysis of the first pixels.

44. The method of claim 34:
wherein the step of driving the first pixels with the first orthogonal code and the step of driving the second pixels with the second orthogonal code occurs over a first time slot; and
further comprising the steps of:
driving third pixels with the first orthogonal code over a second time slot; and
driving fourth pixels with the second orthogonal code over the second time slot.

45. The method of claim 44 further comprising the steps of:
driving the first pixels with the first orthogonal code over a third time slot; and
driving the second pixels with the second orthogonal code over the third time slot.

* * * * *